W. B. GOODWIN.
Corn Planter.
No. 82,515.          Patented Sept. 29, 1868.
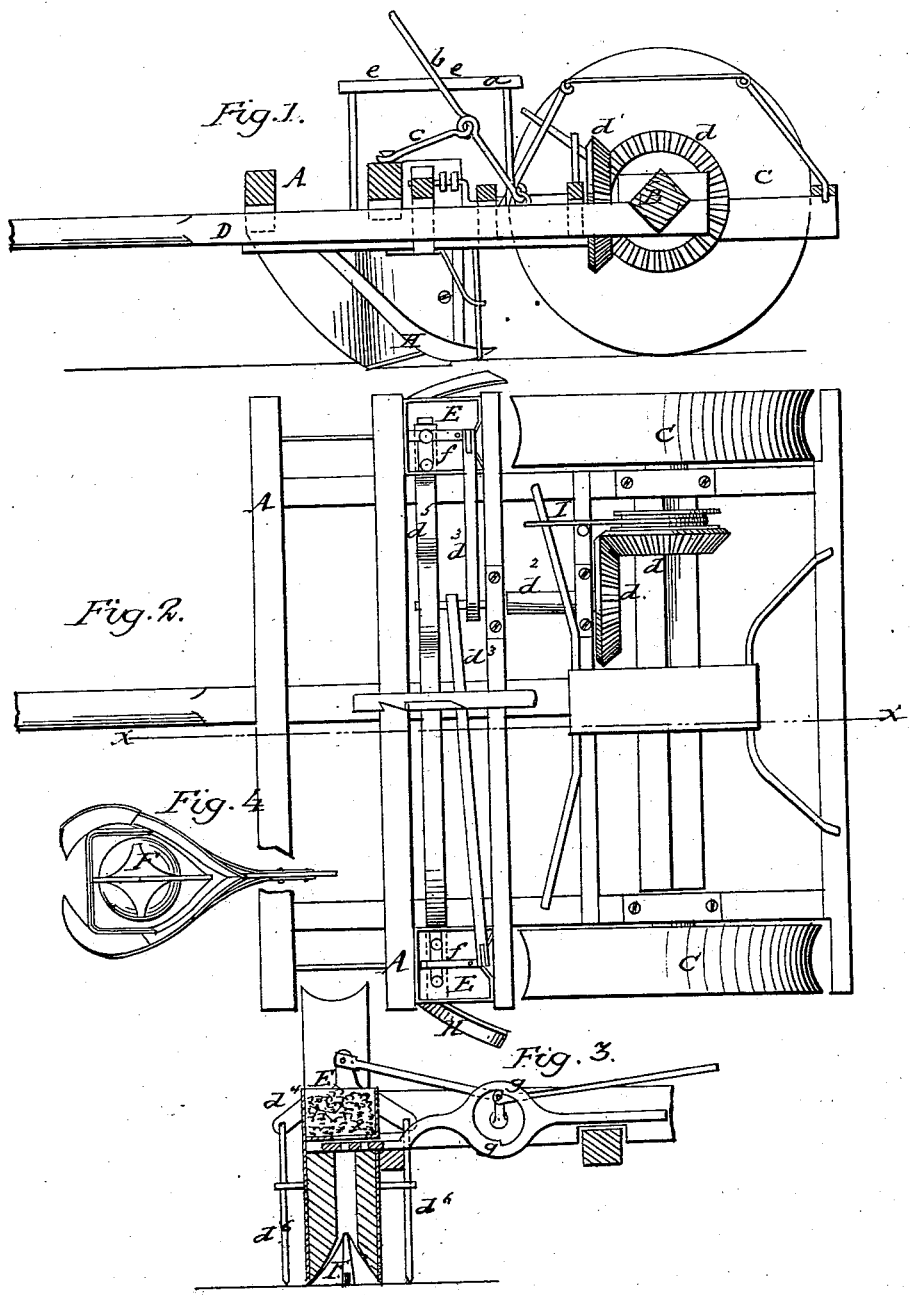
WITNESSES:
INVENTOR:

United States Patent Office.

WILLIAM B. GOODWIN, OF EFFINGHAM, ILLINOIS

Letters Patent No. 82,515, dated September 29, 1868.

---

IMPROVEMENT IN CORN-PLANTER.

---

The Schedule referred to in these Letters Patent and making part of the same.

---

TO ALL WHOM IT MAY CONCERN:

Be it known that I, WILLIAM B. GOODWIN, of Effingham, in the county of Effingham, and State of Illinois, have invented a new and useful Improvement in Corn-Planters; and I do hereby declare that the following is a full, clear, and exact description thereof, which will enable others skilled in the art to make and use the same, reference being had to the accompanying drawings, forming part of this specification, in which—

Figure 1 is a longitudinal section on the line $x\ x$ of fig. 2.

Figure 2 represents a plan view of the same.

Figure 3, a section through one of the hoppers.

Figure 4, a bottom view of one of the plows and the spreader.

Similar letters of reference indicate like parts.

The nature of my invention relates to improvements in corn-planters, the object of which is to provide markers, to show the rows of corn in both directions, and a spreader, for spreading the grains of corn as they drop into the ground; and it consists of the arrangement of mechanism for accomplishing the same, as will be more fully described.

A represents the frame of the machine, which is supported on the axle B.

C C represent the driving-wheels.

$a$ represents a stand, elevated above the tongue D, on which it is supported.

$b$ represents a hand-lever, jointed at one end to the tongue, and connected near the centre of the same to the link $c$, which is jointed to one of the cross-pieces of the frame.

$e\ e$ represent notches in the top of the stand. By changing the lever $b$ from one notch to another, the elevation of the frame, and, consequently, the elevation of the plows, may be changed to govern the depth to which they will work, the position of the tongue being governed at one end by the axle, and at the other by the connection with the harness.

$d$ represents a driving-wheel, on the axle which communicates motion through the wheel $d^1$ to the crank-shaft $d^2$ to the connecting-rods $d^3$ and dropper-slide $d^5$.

To the outer ends of the connecting-rods $d^3$ are connected swinging arms, $d^4$, from which vertical marking-rods, $d^6$, are suspended.

The respective sizes of the wheels C and gear-wheels are so calculated and arranged, with reference to each other, that each half revolution of the crank-shaft effects the movement of the dropper-slide and of the markers; hence two vertical marking-rods are used on each vibrating-arm, $d^4$, one marking on one side of the track, produced by the wheel, and the other on the other side. The wheels indicate the rows in the other direction.

E E represent the hoppers, arranged over the tubular plows in the usual manner, and provided with an opening in the bottom, which is divided by the plate $f$. The dropper-slide is provided with two holes in the ends that work in the said hoppers, whereby a sufficient amount of grain is dropped for one hill at each half revolution of the crank, one hole, which has been (while the dropper-slide has been standing) filled by the grain settling down into it, being forced under the plate $f$, when the grain in the said hole or pocket is delivered through the tubular opening down to the ground, while the grain in the hoppers is prevented from descending into the said pocket by the plate $f$. During this operation, the other pocket is becoming filled, as will be readily understood.

The intermitting action of the slide-dropper is produced by the action of the crank $d^2$ on the cam-notches $g'g$, within the opening in the said dropper-slide.

F F are spreaders, suspended within the tubular plows, having conical or pointed upper ends, with a broad base, whereby the grains are spread in different directions as they fall upon the inclined sides of the spreaders.

H H are curved wings, following behind the plows, to turn the earth back over the grain.

I is a hand-lever, for slipping the driving-wheel $d$ out of gear when the machine is to be turned around. After it has been turned around, the driver stops the machine, when the plows and dropper will have come on a line with the first row, running perpendicular to the direction in which the machine is going, when he turns the wheel $d^2$ by hand until the grain for that row is dropped. He then slips the wheels into gear, and proceeds on his way.

Having thus described my invention, I claim as new, and desire to secure by Letters Patent—

The combination, with a corn-planting machine, of the marking-rods $d^6$, substantially as and for the purpose described.

Operating the markers $d^6$, from the crank-shaft $d^2$, by means of the connecting-rods $d^3$, rocker-arm $d^4$, substantially as and for the purpose described.

Operating the dropper-slide, by means of the crank-shaft $d^2$ acting on the cam-projections $g\ g$, substantially as and for the purpose described.

The arrangement of the hopper E, plate $f$, perforated ends of the dropper-arm $d^5$, and the tubular plows, substantially as and for the purpose described.

WILLIAM B. GOODWIN.

Witnesses:
  JOSEPH C. SMITH,
  E. N. UPTON.